UNITED STATES PATENT OFFICE.

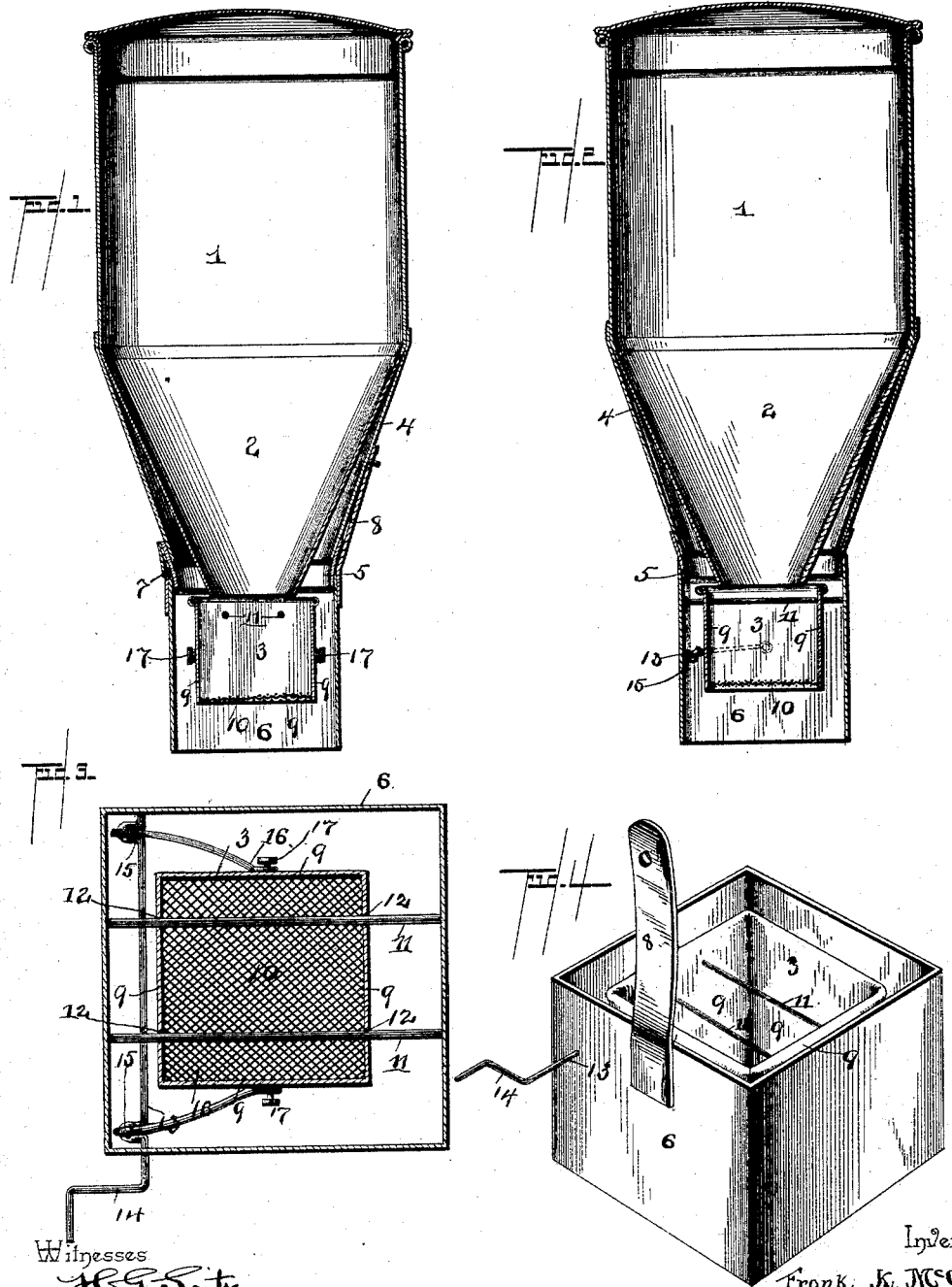

FRANK K. McCAGUE, OF SHELL ROCK, IOWA.

FLOUR BIN AND SIFTER.

SPECIFICATION forming part of Letters Patent No. 485,210, dated November 1, 1892.

Application filed September 25, 1891. Serial No. 406,822. (No model.)

*To all whom it may concern:*

Be it known that I, FRANK K. McCAGUE, a citizen of the United States, residing at Shell Rock, in the county of Butler and State of Iowa, have invented a new and useful Flour Bin and Sifter, of which the following is a specification.

The invention relates to improvements in flour bins and sifters.

The object of the present invention is to provide for flour-bins a simple, inexpensive, and easily-operated sifter in which insects, impurities, and the like will not be ground and forced through the meshes of the sifter.

The invention consists in the construction and novel combination and arrangement of parts hereinafter fully described, illustrated in the accompanying drawings, and pointed out in the claim hereto appended.

In the drawings, Figure 1 is a vertical longitudinal sectional view of a flour bin and sifter constructed in accordance with this invention. Fig. 2 is a similar view taken at right angles to Fig. 1. Fig. 3 is a horizontal sectional view. Fig. 4 is a detail perspective view of the sifter-casing and sifter.

Like numerals of reference designate corresponding parts in all the figures of the drawings.

1 designates a cylindrical bin having a conical lower portion 2, provided at its bottom with a discharge-opening, beneath which is arranged a reciprocating sifter 3. The bin is designed to be secured to a wall or other suitable supporting-surface and has at its lower portion an outer casing 4, surrounding the conical portion 2 and having a rectangular open bottom or mouth 5, at one side of which is hinged a rectangular sifter-casing 6, which contains the reciprocating sifter 3. The rectangular sifter-casing is secured at the side opposite the hinge 7 by a spring-catch 8, arranged to engage a projection of the outer casing of the bin. The sifter 3 is rectangular in section and consists of four sides 9 and a wire-gauze bottom 10, and is mounted on horizontal parallel rods 11, passing through oppositely-disposed openings 12 of the sifter and having their ends secured to opposite sides of the sifter-casing. A shaft 13 is journaled in openings of the sides of the sifter-casing and is provided at one end with a crank-handle 14, and has intermediate its ends crank-loops 15, arranged within the casing and connected by pitmen with the sifter, whereby the latter is reciprocated when the shaft is located. The pitmen 16 are provided at their ends with eyes or loops, which engage the crank-loops of the shaft, and headed pins 17, projecting from the outer faces of opposite sides of the sifter. The horizontal parallel rods 11, besides serving as means for mounting and suspending the sifter within the casing, are located beneath the discharge-opening of the conical portion of the bin or hopper and serve to break up and disintegrate any large lumps of flour falling into the sifter.

It will be seen that the flour bin and sifter are simple and inexpensive in construction, that the sifter is reciprocated and operated similarly to the ordinary hand-sifter, and that there is no liability of grinding up impurities, insects, and the like and forcing the same through the meshes of the sifter, as would be the case were an agitator employed to force flour through the sifter.

What I claim is—

The combination of a bin having a lower conical portion 2 and provided with an outer casing 4, surrounding the conical portion 2 and secured to the bin and having its lower end of greater diameter than the lower end of the conical portion 2 and terminating at the lower end thereof, a sifter-casing detachably secured to and supported by the lower end of the outer casing 4 and arranged beneath the same, and a reciprocating sifter mounted in and supported by the sifter-casing and arranged beneath the conical portion 2, said conical portion 2 forming a discharge-opening for the bin, substantially as described.

In testimony that I claim the foregoing as my own I have hereto affixed my signature in the presence of two witnesses.

FRANK K. McCAGUE.

Witnesses:
A. L. JAMES,
W. J. REED.